D. H. ATWOOD.
CONVEYER PROTECTOR FOR HARVESTERS.
APPLICATION FILED FEB. 17, 1912.
Patented Apr. 29, 1913.
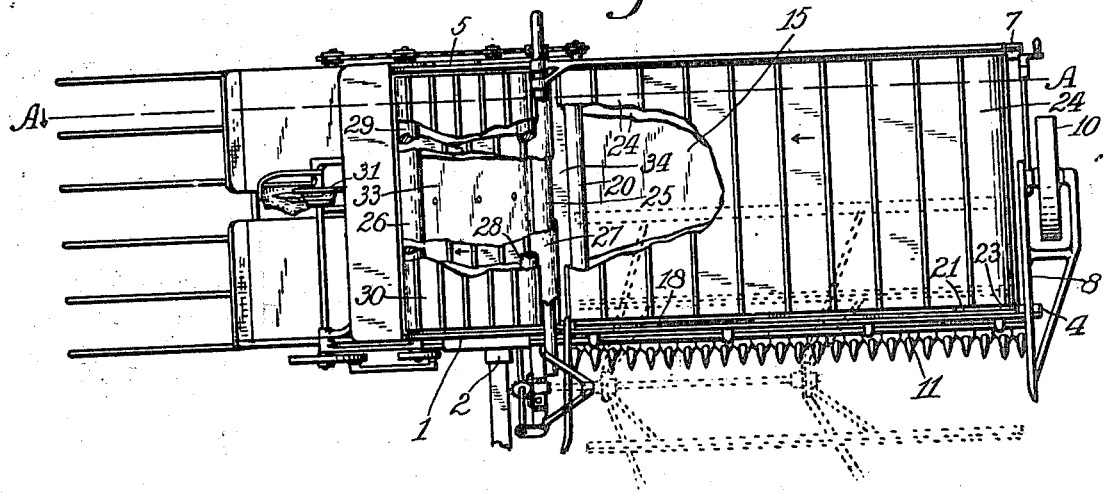
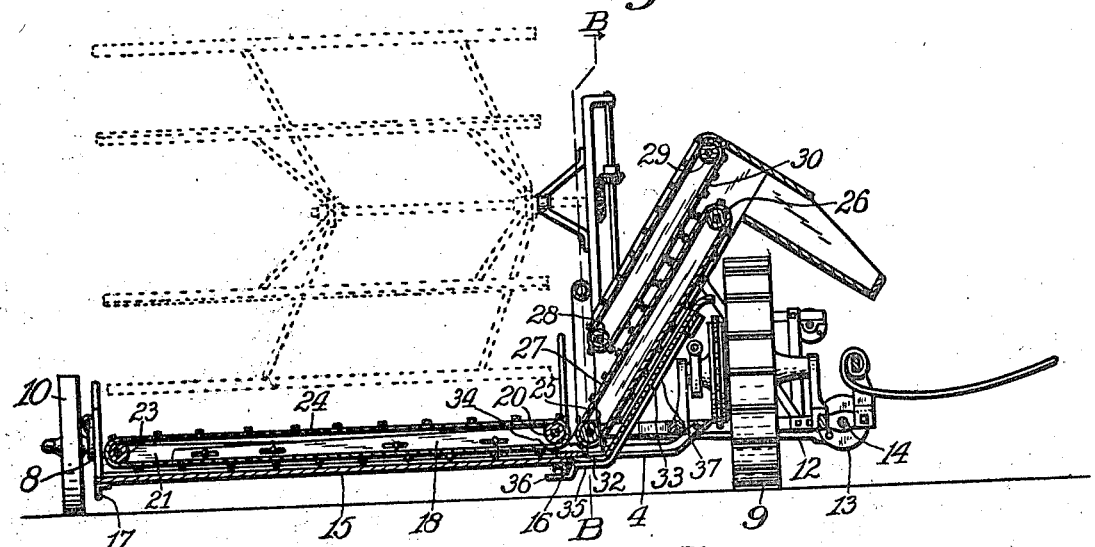
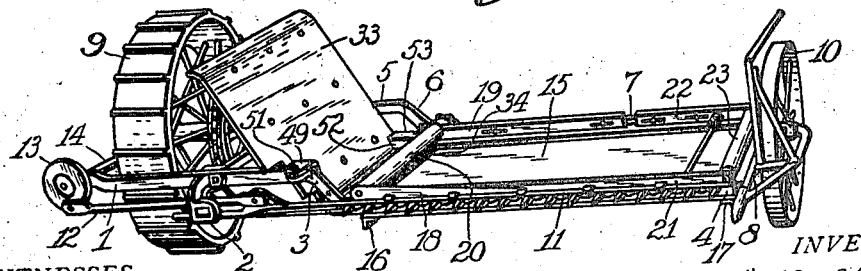

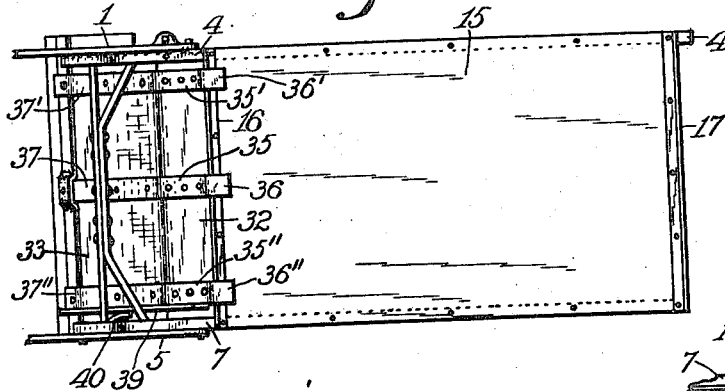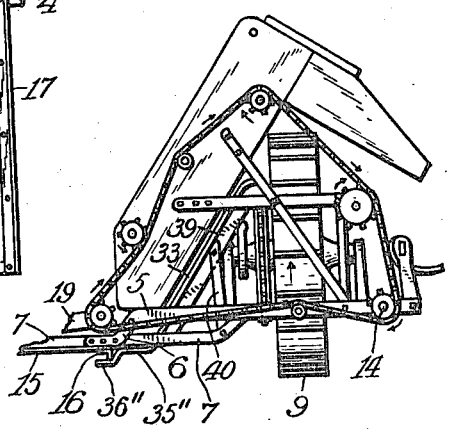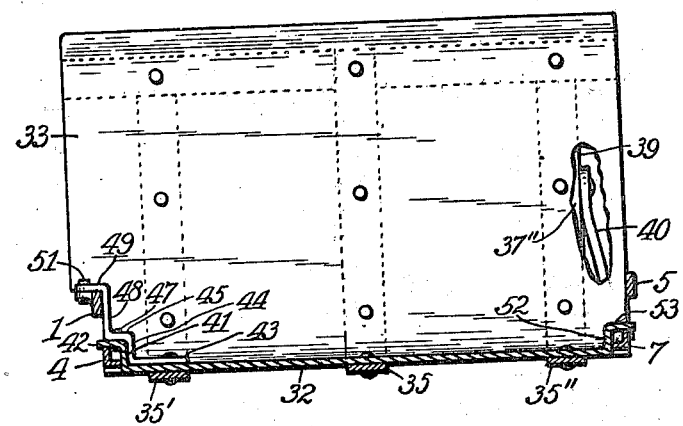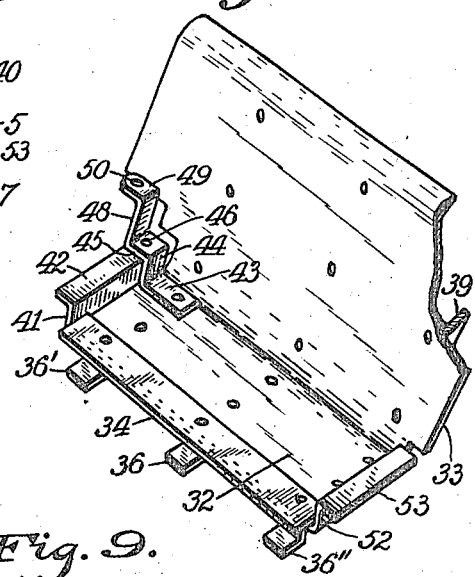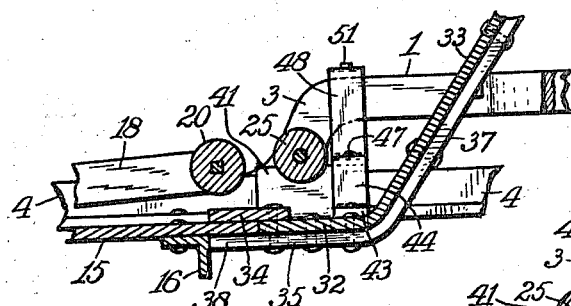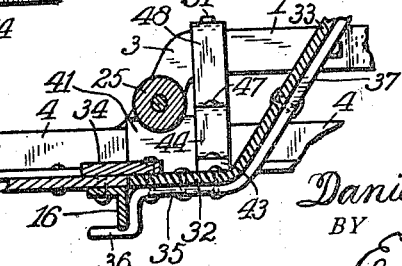

UNITED STATES PATENT OFFICE.

DANIEL H. ATWOOD, OF HENDRICKS TOWNSHIP, SHELBY COUNTY, INDIANA.

CONVEYER-PROTECTOR FOR HARVESTERS.

1,060,059.

Specification of Letters Patent.

Patented Apr. 29, 1913.

Application filed February 17, 1912. Serial No. 678,272.

*To all whom it may concern:*

Be it known that I, DANIEL H. ATWOOD, a citizen of the United States, residing in Hendricks township, in the county of Shelby and State of Indiana, have invented a new and useful Conveyer-Protector for Harvesters, of which the following is a specification, reference being had to the accompanying drawing and to the letters and figures of reference marked thereon.

This invention relates to harvesting machines, especially to the type known as self binders in which the cut grain stalks are conveyed to one side of the machine on an endless canvas conveyer mounted above a floor, the grain stalks being elevated on an inclined elevator to the binder, the present invention having reference more particularly to a guard for preventing the entrance of corn stalks or trash onto the floor at the foot of the elevator and interfering with the operation of the canvas conveyer, and also preventing injury to the elevating apparatus by corn stalks or the like, when harvesting wheat or other small grain grown in fields in which corn has been grown the preceding season.

It has been found desirable in some cases to plant small grain crops in fields which have previously grown corn, and while harvesting machines as heretofore constructed have operated satisfactorily on clean ground, much trouble has been experienced in their use when harvesting wheat or similar grain on ground that is more or less encumbered by corn stalks which may have been left on the field, or scattered thereon as portions of manure, the long stalks or portions of stalks particularly being troublesome, especially when they are crooked and disturbed by the driving wheel of the machine or the draft horses passing over the stalks and causing the ends of the stalks to project upward to be caught between the canvas conveyer and the floor, resulting in choking of the conveyer and necessitating stoppage of the machine to clear away the obstruction, sometimes requiring the removal of the belt conveyer with consequent loss of time.

The object of the present invention is to provide a protector for guarding against trouble of the above-mentioned character and injury to the canvas belts, a specific object being to provide a guard that shall be so constructed that it may be readily connected to a harvester when its use is found desirable and which may be disconnected so as to remove unnecessary weight when not needed while cutting grain on relatively clean ground.

With the above-mentioned and minor objects in view, the invention consists in a novel guard for harvesting machines, and in a novel application of the guard to self binders, and in the parts and combinations and arrangements of parts as hereinafter particularly described and pointed out in the appended claims.

Referring to the drawings, Figure 1 is a top plan of a harvesting machine partially broken away and having the improvement applied thereto; Fig. 2, a transverse section on the line A A in Fig. 1; Fig. 3, a perspective view of a portion of the machine showing relative arrangement of the improved protector in connection therewith; Fig. 4, a fragmentary inverted plan of the machine floor and guard connected therewith; Fig. 5, a fragmentary rear elevation of the machine; Fig. 6, a sectional elevation of the protector taken on the line B B in Fig. 2; Fig. 7, a perspective view of the improved protector partially broken away; Fig. 8, a fragmentary sectional view showing slight modifications as on the line A A Fig. 1; and Fig. 9, a fragmentary section also on the line A A Fig. 1.

Similar reference characters in the different figures of the drawings indicate like elements or features of construction herein referred to.

In order to clearly describe the invention and explain the peculiar function thereof, a reaper or harvester of well known construction is illustrated and the invention shown in connection therewith, the machine frame comprising a front bar 1 provided with a draft iron 2 whereby to connect the tongue to the frame, the bar having a downwardly extending oblique angled portion 3 which is secured to a relatively lower frame bar 4, there being a companion rear frame bar 5 having an oblique angled portion 6 which is secured to a relatively lower frame bar 7, an end member 8 being connected to the ends of the bars 4 and 7. The bars 1 and 5 and other suitable frame members carry the principal gearing, being the main portion of the frame and mounted on a main drive wheel or bull wheel 9, the end member 8 being mounted on a wheel 10. The knife bar 11 is mounted on the frame bar 4 and operated by a pitman 12 connected to a crank-wheel 13 which is carried by a shaft 14, other parts of the mechanism being well known. A floor 15 is carried by the frame bars 4 and 7 and preferably has stiffening bars 16 and 17 secured to the under side of the end portions thereof. Two bars 18 and 19 are secured to the bars 4 and 7 respectively, and rotatably support a driving roller 20 adjacently to the oblique angled portions 3 and 6 of the frame bars. Two other bars 21 and 22 are secured also to the bars 4 and 7 respectively, and rotatably support a roller 23, there being a canvas conveyer belt 24 mounted on the two rollers for receiving the grain after having been cut and conveying it to the elevator. The floor 15, it will be understood, protects the canvas from injury by the stubble passed over by the conveyer. It will be understood that the floor extends only under the canvas, one end of the floor terminating below the roller 20, so that corn stalks extending upward from the ground may be forced between the canvas belt and the end of the floor, especially when drawn in by the slats with which the belt is customarily provided.

The elevator for receiving the grain from the conveyer may be variously constructed and in the machine illustrated comprises a roller 25 rotatably supported by the oblique angled portions 3 and 6 of the frame bars, a roller 26 suitably supported in a plane approximately above the main wheel 9, a belt 27 mounted on the rollers 25 and 26, the belt extending at an inclined angle, there being a roller 28 rotatably mounted somewhat above the roller 25, another roller 29 being mounted above the roller 26, the rollers 28 and 29 supporting a conveyer belt 30 opposite the belt 27 so that the belts coöperate to elevate the grain to the binder 31. The stiff corn stalks at times are pushed up between the rollers 20 and 27 and interfere with the free movement of the grain stalks to the belt 27, the latter belt at times being injured by stalks or rubbish forced against the under portion thereof, being hitherto unprotected.

The improved protector or guard is composed of metal and comprises a horizontal portion 32 adapted to constitute a continuation of the floor 15 and an oblique angled portion 33 extending upward from the portion 32, being composed of sheet metal, the portion 32 when in normal position extending from the floor 15 under the roller 25, the portion 33 extending upwardly under the lower portion of the belt 27. A joint plate 34 is secured to the upper side of the portion 32 and extends beyond the end thereof and upon the end portion of the floor 15 for supporting the guard and forming a complete closure between the ends of the floor and the guard. The under side of the guard has a stiffening bar secured thereto comprising a horizontal portion 35 secured to the portion 32 and extending beyond the end of the latter oppositely to the plate 34, so as to form a finger 36 which in some instances is offset so as to extend under the cross-bar 16 in case the latter is at the end of the floor 15, preventing the horizontal portion 32 from being forced upward, there being a portion 37 of the stiffening bar extending from the portion 35 upward against the lower side of the portion 33. In case the bar 16 is placed a short distance back from the end of the floor 15 a straight finger 38 extends from the portion 35 of the stiffening bar against the under side of the floor. Another stiffening bar of similar form to that described is secured to one end portion of the guard and comprises a horizontal portion 35' having a finger 36' thereon and an upwardly extending portion 37', the opposite end of the guard having a somewhat similar stiffening bar thereon comprising a horizontal portion 35" from which extends a finger 36" and an upwardly extending portion 37", the latter stiffening bar preferably having a flange 39 thereon to which a brace 40 is secured, the brace being detachably connected to the frame of the machine, being suitably connected to the bar 7, which extends under the bar 5. One end of the horizontal portion 32 of the guard is bent upward to form a vertical guard 41 and is bent outward to form a flange 42 adapted to rest upon the bar 4 to prevent stalks from being forced onto the normally forward end of the portion 32 of the guard. The forward end of the guard is provided with a brace which comprises a flat member 43 secured to the top of the horizontal portion 32 adjacent the angular portion 33, an angular member 44 extending from the member 43 against the upright guard 41, a horizontal member 45 extending from the member 44 upon the flange 42 and provided with a bolt-hole 46 to receive a securing bolt 47 whereby to secure the guard to the bar 4, an arm 48 preferably being formed on the end of the member 45 and provided with an angular portion 49 adapted to be supported on the bar 1 of the frame and having a bolt-hole 50 therein to receive a securing bolt 51 connected with the bar 1. The opposite or rearward end of the portion 32 of the guard is bent upward to form an upright guard 52 and bent outwardly to form a flange 53 which rests upon the bar 7 for support.

It will be understood that the guard may be variously secured detachably to the frame, it being adapted to be applied to many harvesting machines now in use as well as to new machines.

In practical use, all corn stalks or sticks that may be thrown up or projected from the ground against the under side of the guard are stopped or warded off by the under side of the guard and prevented from being forced onto the end of the floor 15, so that the canvas belts of the conveyer and also those of the elevator are completely protected from injury.

Having thus described the invention, what is claimed as new is—

1. A conveyer protector comprising a flat plate that has a terminating end on one portion and also an oblique angled extension on the opposite portion thereof, the plate having two end portions that are relatively shorter than the terminating end portion and provided each with an upturned guard having an outwardly extending supporting flange, the terminating end portion having a joint plate secured to one side and fingers secured to the opposite side thereof and extending beyond the terminating end.

2. A conveyer protector comprising two plate portions at oblique angles each to the other, one of the plate portions having upturned guards on two opposite edge portions thereof, each guard having an outwardly extending supporting flange thereon, the end of one of the plate portions having a joint plate and also fingers thereon projecting from opposite sides of the plate portion beyond the end thereof, stiffening bars secured to the outer side of said two angled plate portions, a supporting brace secured to the angled portion that has the joint plate thereon, said brace extending against one of said upturned guards and also upon the flange thereof, and a brace connected to the remaining one of said plate portions of the protector.

In testimony whereof, I affix my signature in presence of two witnesses.

DANIEL H. ATWOOD.

Witnesses:
 HARRY D. PIERSON,
 E. T. SILVIUS.